Dec. 15, 1931.  B. U. HILLS  1,836,247
STEAM GENERATOR
Filed Oct. 15, 1928   3 Sheets-Sheet 1

Inventor:
Burton U. Hills

Witness:
William P. Kilroy

Dec. 15, 1931. B. U. HILLS 1,836,247
STEAM GENERATOR
Filed Oct. 15, 1928 3 Sheets-Sheet 2
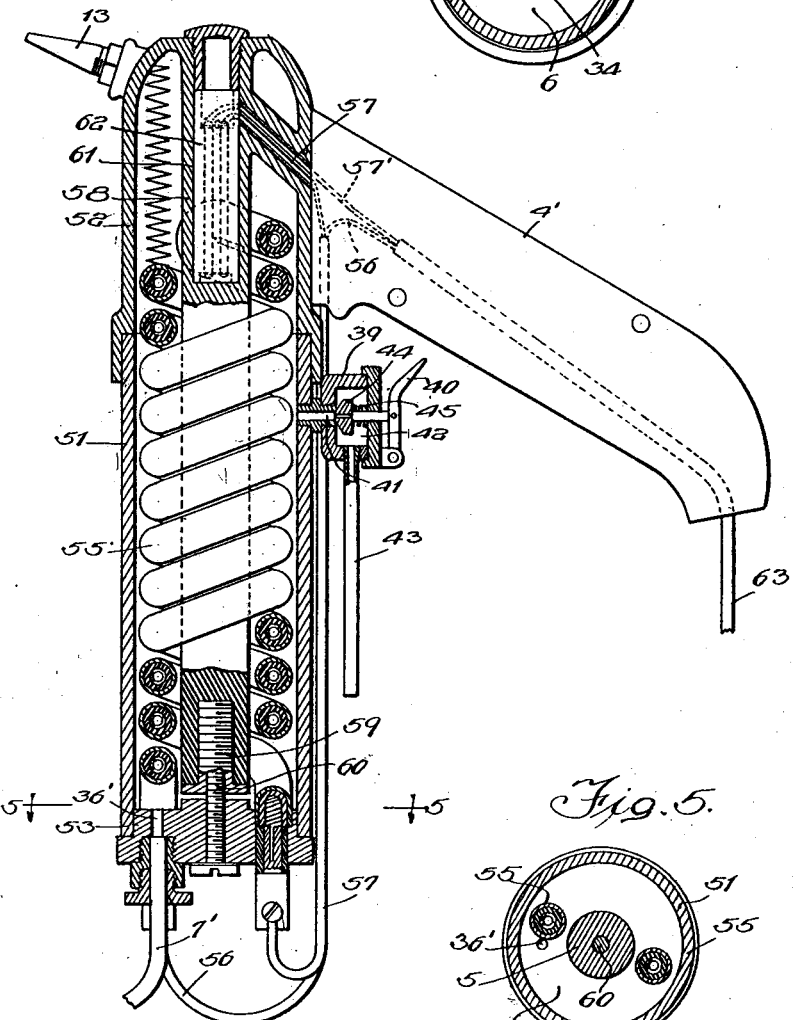

Dec. 15, 1931.  B. U. HILLS  1,836,247
STEAM GENERATOR
Filed Oct. 15, 1928   3 Sheets-Sheet 3
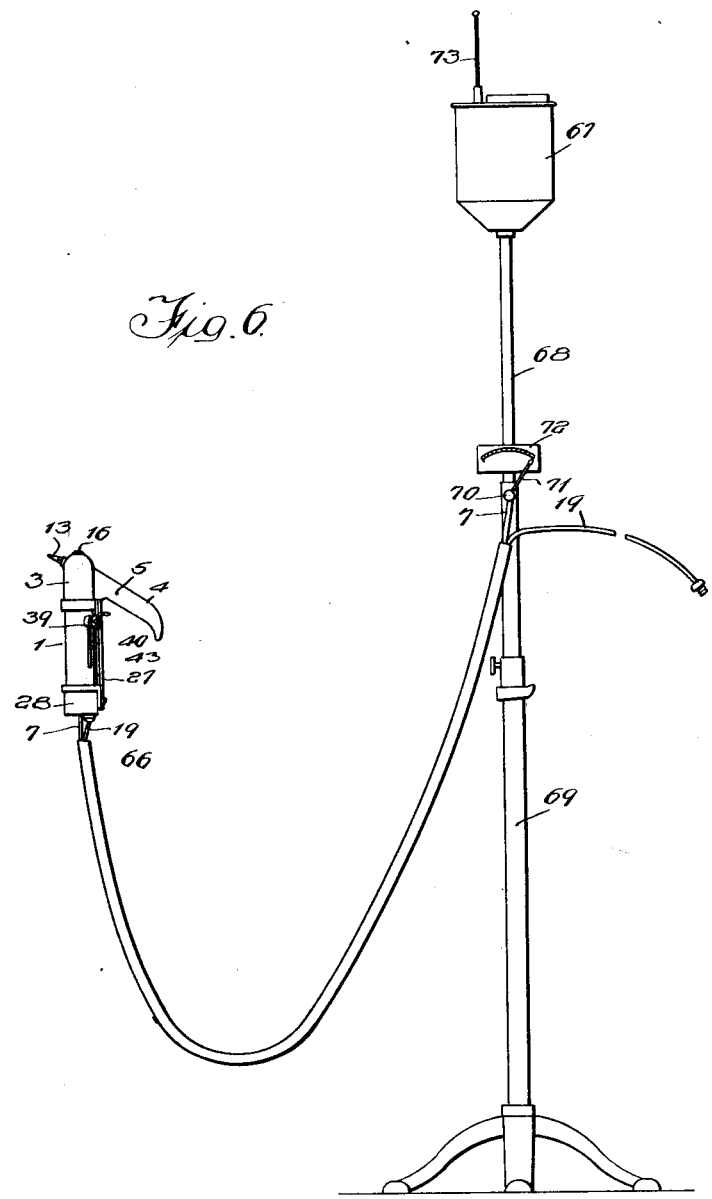
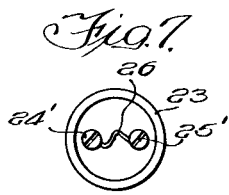
Witness:
William P. Kilroy
Inventor:
Burton U. Hills Patented Dec. 15, 1931

1,836,247

UNITED STATES PATENT OFFICE

BURTON U. HILLS, OF CHICAGO, ILLINOIS

STEAM GENERATOR

Application filed October 15, 1928. Serial No. 312,598.

My invention relates to the general class of devices known as steam generators and more particularly to a device in which steam is both generated and superheated and discharged from the generator with a low moisture content. The invention has among its objects the production of a device of the kind described which is simple, durable, compact, inexpensive, portable, substantially automatic in operation, economical in cost of operation, efficient and satisfactory for use wherever found applicable. More particularly the same has as an object the production of a generator which is rapid in operation, that is to say, it will rapidly raise the temperature of water below steaming temperature to a temperature where steam is generated, and at the same time superheat or dry the generated steam so that a steam of low moisture content is discharged from the generator in the required quantity. The invention has among its further objects the production of a generator of the kind described that is substantially automatic in operation, water being admitted to the generator in a quantity to maintain a substantially constant water level in the generator to replace the water evaporated during the generation of the steam. The device has among its further objects the production of a generator of the kind described preferably provided with an electrically operated generating unit and provided with a safety device whereby the electrical unit will become inoperative in the event of a short circuit in the generator or become inoperative in event the temperature within the generator due to lack of water or for other reasons rises above a predetermined temperature whereby the device cannot become seriously damaged when in operation. The invention has among its further objects the production of a simple feed water control and manually controlled means for controlling the water level within the generator and permitting discharge of excess water.

Among its further objects is the production of a simple, light weight, convenient, portable and efficient steam generator that will uniformly generate sufficient steam for the steaming of various fabrics such as plushes, velvets, as well as wearing apparel, draperies, rugs, or the like, either as an operation in itself or as a step in other operations. It is particularly desirable for use in tailoring establishments but there are many other uses which need not be enumerated herein as many other objects, advantages and uses will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 3 is a section taken substantially on line 3—3 of Fig. 1;

Fig. 4 is a sectional view similar to Fig. 1, illustrating another embodiment of the invention;

Fig. 5 is a sectional view taken substantially on line 5—5 of Fig. 4;

Fig. 6 is a view in elevation of the device, together with the water reservoir and port therefor; and Fig. 7 is an end elevation of a suitable fuse unit which may be employed in the device.

Figure 1:
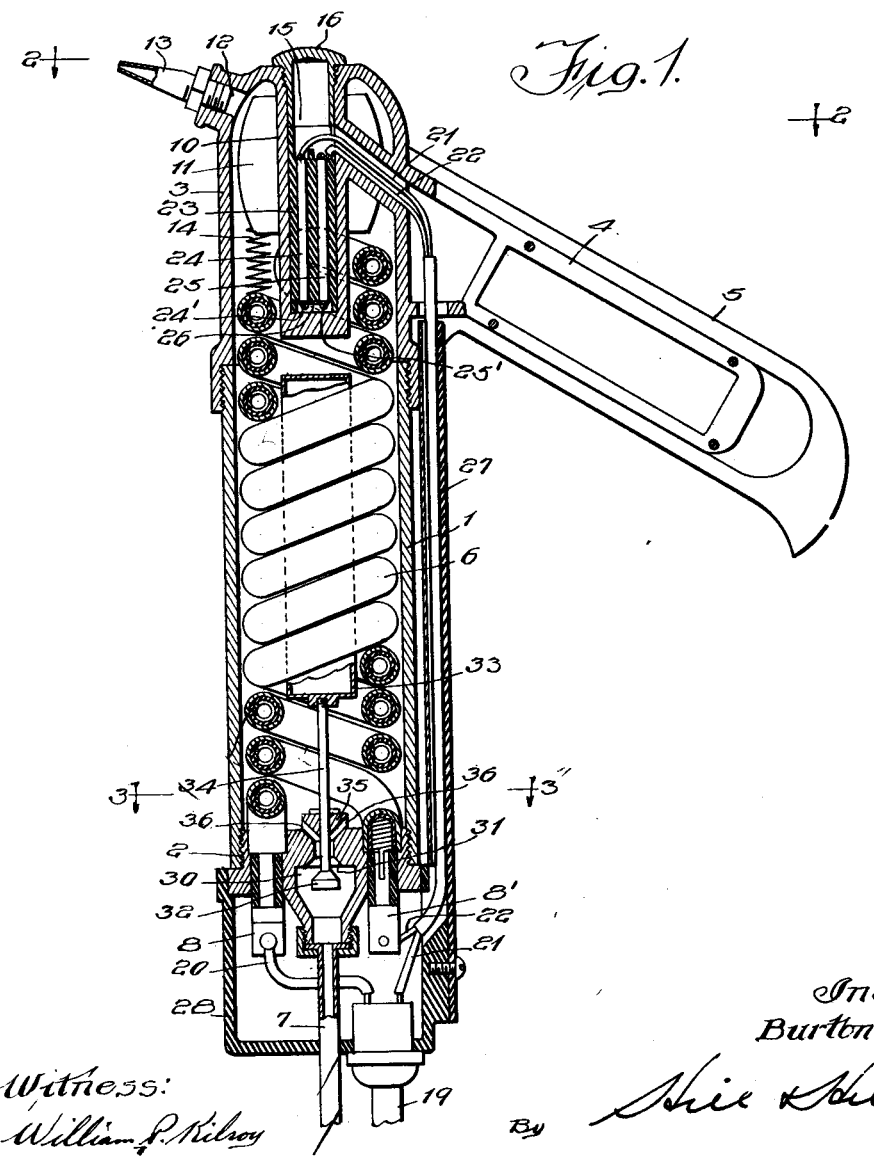
Fig. 1 is a sectional elevation of one form of the invention.

Referring to the drawings in which only two embodiments of the invention are shown, as shown in Fig. 1 there is provided a container or casing which may be of suitable size, shape and material, that shown consisting of a shell portion 1 provided with a closure of plug 2 at one end and a closure or cap 3 at the opposite end. The enclosure parts may be made of aluminum, brass or any material suitable for the purpose, and in some instances glass might be used for parts of the container and in the construction shown a vertical type of generator is illustrated in which the heating element to be hereinafter described, extends from adjacent the lower portion to adjacent the top or the upper portion of the container. The generator is provided with a handle 4 for convenience in handling, the same being provided with grips 5 of material that will not easily conduct heat so that the device may be held in the hand and used without discomfort to the user.

Arranged within the container is the heating element 6, an electrical heating coil or unit being shown, which is constructed in the form of a spiral coil extending upwardly to a point above the normal water level and thence back to the lower portion of the casing. This coil need not be described in detail, except to say that the coils are arranged in a metallic or like jacket which is so sealed up that water within the generator cannot reach the heating element wires and short circuit the same. As shown, the two ends of the heating coil are secured in the end closure 2, the conductors extending through bushings of insulating material and secured to binding posts 8 and 8'. Water is admitted to the generator through a feed water pipe 7, as will be described hereinafter. It may be mentioned that the water may be fed by gravity or by pump.

Arranged in the upper portion of the generator in what may be termed the steam space or chamber is what may be termed a superheating member arranged to be heated by the heating element or coil which when so heated to a high temperature will dry or superheat the steam. The same projects downwardly to the desired point as shown in the center of the heating coil from which it derives its heat, and may be provided with fins or ribs 11 so as to increase the radiating surfaces. The steam outlet of the generator is indicated by the numeral 12, 13 being a nozzle of the desired size and shape projecting from the outlet. As will be noted the steam outlet is preferably so arranged that generated steam must pass over and around the member 10 and ribs 11 before it is discharged through the outlet, so that it is thoroughly dried or superheated in advance of its discharge. If desired, coil springs or the like 14 may be arranged between the fins 11, increasing the superheating surfaces, these springs deriving heat from the member 10 and the ribs as well as from the coil.

The member 10 is preferably formed with a chamber 15 in the same which may be closed by a cap 16. Within the chamber is arranged a device for controlling the heating element circuit and breaking the circuit in the event of a short circuit of the heating coil or in the event that the temperature within the generator rises above a predetermined degree. As shown, 20 and 21 represent the conductors from a source of electrical energy, as for example from a cord 19 extending to lighting socket or the equivalent. One conductor, as for example 20, may be connected directly to the binding posts 8. The other conductor, however, instead of being connected to the binding post 8', preferably extends up into the chamber 15 to a circuit controller. Extending from the circuit controller is a return wire 22. This extends to the binding post 8'. The particular circuit controller illustrated consists of a body part 23 of heat resisting insulating material containing conductors 24 and 25 to which the conductors 21 and 22 are connected. These two members 24 and 25 are connected at their lower ends by a fusible link 26 secured by the screws 24' and 25'. It will be noted that this fusible link is located at a point within the generator where it will be affected by overheating of the coil or by the temperature within the generator. The conducting wires 21 and 22 are enclosed in a conduit 27 which may be secured to the generator casing in any suitable manner, and the lower end of the generator is provided with the closure 28 enclosing the electrical and water connections to the generator.

Referring to Fig. 1, the closure 2 is shown provided with a water passage 30 communicating with the feed water pipe and with the interior of the generator. In this particular embodiment of the invention, means is shown for shutting off the supply of feed water to the generator when the same reaches substantially a predetermined water level in the generator. A valve seat 31 is provided in the passage or chamber 30 and arranged to co-operate with the valve 32 which may be controlled in any suitable manner either by the amount of water in the container or by the temperautre thereof as may be desired. The particular controlling means illustrated is a float 33 arranged on the valve stem 34. The valve stem is guided by the part 35 on the closure, 36 being water ports through which water may pass into the generator. The normal water level within the generator is substantially at the point marked WL on the figure, slight variations either way, however, that is, above or below this mark, not materially affecting the operation of the generator. Ordinarily when the water reaches about this level, the valve 32 is closed by the float, thereby preventing the admission of any more water until further steam has been generated and the water level drops due to the evaporation. It will be particularly noted by referring to Fig. 2 that the water space within the generator is comparatively limited inasmuch as the coil extends fairly close to the walls of the generator and the float 33 and member 10 extend fairly close to the coils. The result is that the generator will steam almost immediately the heating circuit is closed, and will continue to generate steam more or less uniformly until the circuit is broken.

Figure 2:
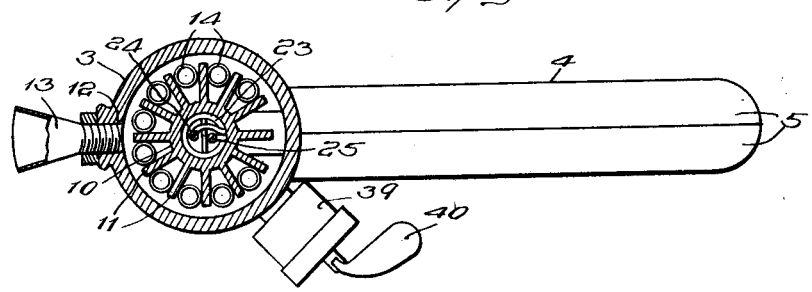
Fig. 2 is a section taken substantially on line 2—2 of Fig. 1.

To provide for quick discharge of water from the generator in the event that too much water enters the generator, a manually operated relief valve is shown. This consists of a port normally closed by a valve arranged slightly below the normal water level in the generator. This may be of any type of valve construction. In Fig. 2 I have illustrated a valve casing 39 provided with a suitable valve controlled by the member 40. A simple arrangement of a suitable relief valve mechanism is shown in Fig. 4, the showing in Fig. 2 representing the external view of the same. Reference may be had to Fig. 4 in which 41 represents a port communicating with the chamber 42, the casing 39, and which communicates with the drain pipe 43. Valve 44 controls the discharge of water from the container. The valve is normally maintained on its seat by a spring 45 or equivalent means for the purpose.

Referring now to Figs. 4 and 5 in which another embodiment of the invention is shown, 51 represents the casing or shell provided with the end closures 52 and 53 corresponding with the closures 2 and 3 of the construction previously described. Arranged within the casing is a heating coil 55, the same being suitably mounted on the closure 53 and connected with the conductors 56 and 57. It will be noted that the float shown in Fig. 1 is omitted and the element or member 58 corresponding with the member 10 is extended downward through the center of the heating element to the closure 53 and secured thereto. Where the member 58 is of aluminum or like material, a brass plug 59 is preferably screw threaded into the end thereof, the plug being provided with an internally threaded bore which is engaged by a screw 60 passing through closure 53. The plug 59 of brass is preferably provided inasmuch as brass or any number of other materials of different coefficients of expansion than aluminum have a tendency to freeze, as it were, in aluminum when screw threaded therein, and as will be hereinafter mentioned the member 58 is preferably of aluminum. As will be noted the closures and casing part 51 are secured together by 58, 59 and 60. Water communication to the heater is through the conduit 7' suitably connected to the closure and communicating with the feed water inlet port 36'. As in the other construction, a recess 61 is provided in the member 58 and the fuse member 62 inserted therein. Conductors 56 and 57 extend up to the handle, the fuse being connected in one and the wires then extended through the usual cord 63 to a suitable source of energy. This type of the device is also provided with the manually operated vent previously described by means of which the water level in the heater may be quickly lowered. Fins or ribs may be provided on the member 58 as may also the spiral springs about the same if so desired.

In Fig. 6 I have shown the source of water supply, and referring to this figure, 7 represents the feed water pipe and 19 the electrical wires all of which extend through a flexible conduit 66 to a suitable stand. The stand consists of a feed water receptacle 67, a conduit and support 68 for the receptacle, and a supporting base 69. The conduit 7 is connected to the pipe 68 through a valve 70 (not shown in detail) so that feed water from the tank 67 may be discharged into the conduit 7 in a desired quantity. For indicating the setting of the valve I have provided an indicator 71 movable with the valve and arranged to indicate the setting of the valve on the scale 72. The receptacle 67 may be provided with a float, only the stem 73 being shown, which will visibly indicate the supply of water in the receptacle 67 so that the same may be replenished from time to time before the receptacle runs dry. Where preferred the water may be supplied to the generator by means of a suitably driven pump or its equivalent (not shown).

The operation of the device may be briefly described as follows: Connection is established with a source of water supply as for example the receptacle 67, and water admitted to the casing. The heating element is then energized by turning on the electric current. The amount of water admitted to the casing is sufficient to only partially submerge the heating coil, the same ordinarily in the construction shown in Fig. 1 reaching the water level indicated at W. L. and substantially the same level as indicated by W. L. in Fig. 4. In either construction the water space is very limited, although there is a sufficient quantity of water within the casing. Owing to the thin sheet of water flowing in and traveling up the coil, the generating of the steam is very rapid and the device begins to generate almost instantly. The generated steam passes over the upper unsubmerged end of the heating coil, over the surfaces of member 10, the ribs 11 and springs 14, as shown in Fig. 1, or over the upper end of the coil, the member 58 and springs or ribs, if employed in the construction shown in Fig. 4, so that the steam is superheated or dried and discharged from the casing through the outlet 12 and nozzle 13 in a superheated or dried condition. The member 10 or the member 58 are preferably made of aluminum or some material that is of high thermal conductivity. There is thus provided in the device in the steam chamber above the water level a relatively large radiating surface of metal over which the steam must pass in leaving the generator so that the steam is thus purged of a very large percentage of its moisture content. In using the springs which may be removed or inserted, it is possible to regulate the moisture content of the steam by varying the radiating area of the metal. These parts all constitute a superheater arranged within the container or casing in the steam chamber and are operative to superheat or dry the steam when generated prior to its discharge, so that superheated or dried steam is emitted. In the form of device shown in Fig. 1, the float by controlling the valve will limit the rate of flow or the admission of feed water to an amount necessary to replace the water evaporated and discharged as steam and maintain a more or less constant water level in the device. In the event that there is too much water in the device, the excess water may be discharged by manipulating the valve 44. By keeping the heating coil submerged and withdrawing heat from the upper end of the coil by the superheating elements, the device does not overheat. In the event, however, that the coil should overheat or there be too much heat in the container, the fusible link 26 would be fused, breaking the circuit of which the heating coil is a part, thereby rendering the heating coil immediately inoperative so that the parts will not be injured by an excess of heat. Likewise should any part of the device become short-circuited the link would burn out, thereby shutting off further electricity to the device. In the construction shown in Fig. 1, the control valve 70 may also be employed to regulate the amount of feed water admitted to the casing. For the construction shown in Fig. 4, the valve 70 alone controls the admission of feed water. It will be obvious that the pressure of the feed water will depend upon the relative elevations of the feed water container 67 and the generator.

The device as shown is of extremely light weight and can be readily handled. It may be placed in operation quickly as it requires ordinarily only from twenty to thirty seconds to obtain steam of a desired degree of dryness. The device contains but a small amount of water which must be heated up to a temperature sufficient to generate the steam, and while the exact level may vary to some extent, it being difficult to determine exact water level, from the tests made it would appear that it is substantially as indicated in the drawings for satisfactory operation. The process of heating the water, generating the steam and superheating the steam gradually proceeds from the bottom of the container where the water is admitted up to the point where the steam is formed superheated and discharged. The steam at the water level of course has water in suspension and this is removed by the superheater. The particular embodiment of the invention disclosed is especially designed for tailoring establishments, cleaners, pressers, etc., but it may be varied in design and size depending on the various uses to which the device may be further applicable.

Having thus described my invention, it is obvious that various immaterial modifications may be made in the same without departing from the spirit of my invention, hence I do not wish to be understood as limiting myself to the exact form, construction, arrangement and combination of parts herein shown and described or uses mentioned.

What I claim as new and desire to secure by Letters Patent is:

1. In a portable generator of the kind described and in combination, a casing provided with a feed water inlet and with a steam outlet, means for supplying water to said casing as required, an electric heating coil arranged within the casing and provided with a portion projecting above the normal water level into the steam space, said heating coil mounted in the lower end of the casing and extending upwardly and returning to the lower end, the terminals of said coil extending to the exterior of the casing, and fusible means arranged in the upper part of said casing for controlling the operation of said heating coil.

2. In a steam generator of the kind described and in combination, a casing provided with a fluid inlet adjacent one end and with a steam outlet adjacent the other end, a heating element arranged in the casing extending from the water inlet end to adjacent the opposite end of the casing, consisting of an enclosed electric heating coil extending spirally from said water inlet end of the casing and thence spirally back to the same end, a core arranged within said coil thereby reducing the water capacity of the casing, and a superheater element arranged adjacent the steam outlet end of the casing and projecting into the center of the spiral coil.

3. In a steam generator of the kind described and in combination, a casing provided with a fluid inlet adjacent one end and with a steam outlet adjacent the other end, a heating element arranged in the casing extending from the water inlet end to adjacent the opposite end of the casing, consisting of an enclosed electric heating coil extending spirally from said water inlet end of the casing and thence spirally back to the same end, a core arranged within said coil thereby reducing the water capacity of the casing, a superheater element arranged adjacent the steam outlet end of the casing and projecting into the center of the spiral coil, and heat controlling means arranged within said superheating element operative to break the electric circuit of the coil automatically when the superheater element is heated above a predetermined temperature or said heater coil is short circuited.

4. In a steam generator of the kind described and in combination, a casing provided with a fluid inlet adjacent one end and with a steam outlet adjacent the other end, a heating element arranged in the casing extending from the water inlet end to adjacent the opposite end of the casing, consisting of an enclosed electric heating coil extending spirally from said water inlet end of the casing and thence spirally back to the same end, a core arranged within said coil, thereby reducing the water capacity of the casing, a superheater element arranged adjacent the steam outlet end of the casing and projecting into the center of the spiral coil, and means for venting the casing to permit the discharge of water as desired.

5. In a portable steam generator of the kind described and in combination, a casing provided with a fluid inlet adjacent the lower end and with a steam outlet adjacent the top end, a heating element arranged in the casing and extending from the bottom to a point above the normal water level, consisting of an enclosed electric heating coil extending spirally from the bottom of the casing and thence spirally back to the bottom, a superheating core adjacent the steam outlet and projecting into the center of the spiral coil, and for breaking the electric circuit in the coil when the superheater core is heated to a predetermined temperature, and manually controlled means for venting the casing to permit the discharge of contained water as desired.

6. In a steam generator of the kind described and in combination, an elongated casing provided with a water inlet at one end and with a steam outlet at the opposite end, a heating element arranged within the casing and extending from the water inlet end to adjacent the opposite end to a point above the normal water level in the casing, a superheating element arranged in operative relation with said heating element whereby said heating element is operative to heat the water to steaming temperature and to heat said superheater element, and means within the casing for automatically rendering the heating element inoperative when the temperature within the casing reaches a predetermined value.

7. In a steam generator of the kind described and in combination, an elongated casing provided with a feed water inlet at one end and with a steam outlet at the opposite end, means within the casing for controlling the admission of water through said feed water inlet, a heating element arranged within the casing adjacent the bottom thereof and of a length to project above the normal water level in the casing, a superheating member arranged in close relation with said heating element whereby the same is operatively heated by said heating element, means for automatically rendering the heating element inoperative when the temperature of the heating element reaches a predetermined degree, and means for supplying feed water to said feed water inlet in quantities as required.

8. In a steam generating device of the kind described and in combination, a casing provided with water inlet and steam outlet and having an electric heating coil constructed to provide a water space, and means in said space for reducing the cubic area of the space and limiting the water capacity of the casing, said means being adapted to control the admission of water to the casing in a manner to maintain a substantially constant water level and partially submerge the heating coil.

9. In a steam generator of the kind described and in combination, a casing provided with a water inlet and steam outlet, means for supplying water to said casing, an electric heating element comprising a coil extending spirally into the casing between said inlet and outlet, and means positioned within said coil for maintaining the water level in said casing between the upper and lower ends of said element.

10. In a steam generator of the kind described and in combination, a casing provided with a water inlet and steam outlet, means for supplying water to said casing, an electric heating element comprising a coil extending spirally into the casing from one end thereof and thence spirally back to the same end and positioned between said inlet and outlet, and a float positioned within said coil for maintaining the water level in said casing between the upper and lower ends of said element.

11. In a generator of the kind described and in combination, a casing provided with a feed water inlet and with a steam outlet, a heating element arranged within the casing for heating water sufficient to generate steam, means positioned within the confines of said heating element and operatively related to said inlet for controlling the admission of water to the casing in a manner to provide a substantially constant water level and a steam space within the casing, and a superheater positioned in said steam space.

12. In a generator of the kind described and in combination, a casing provided with a feed water inlet and with a steam outlet, a heating element arranged within the casing for heating water sufficient to generate steam, means positioned within the confines of said heating element and operatively related to said inlet for controlling the admission of water to the casing in a manner to provide a substantially constant water level and a steam space within the casing, a superheater positioned in said steam space, and means in said superheater for rendering said heating fluid inoperative when the temperature in the casing rises above a predetermined degree.

In testimony whereof, I have hereunto signed my name.

BURTON U. HILLS.